United States Patent [19]
Cohn et al.

[11] 3,964,003
[45] June 15, 1976

[54] ARC OPERATED Q SWITCH FOR LASER

[75] Inventors: David B. Cohn, Torrance; Vaughn G. Draggoo, Huntington Beach; William B. Lacina, Los Angeles; Laurence E. Brown, Huntington Beach; Merrill M. Stone, Rolling Hills Estates, all of Calif.

[73] Assignee: Northrop Corporation, Los Angeles, Calif.

[22] Filed: Feb. 26, 1975

[21] Appl. No.: 553,270

[52] U.S. Cl. .......................................... 331/94.5 Q
[51] Int. Cl.² ........................................ H01S 3/11
[58] Field of Search ................................. 331/94.5

[56] References Cited
UNITED STATES PATENTS

| | | | |
|---|---|---|---|
| 3,433,555 | 3/1969 | Tomlinson | 331/94.5 |
| 3,521,069 | 7/1970 | De Maria et al. | 331/94.5 |

*Primary Examiner*—William L. Sikes
*Attorney, Agent, or Firm*—Edward A. Sokolski

[57] ABSTRACT

A laser beam is passed between a pair of electrodes, the switching of the beam being accomplished by generating an arc between the electrodes whereby metal vapor is ablated therefrom. The metal vapor acts to either refract or totally block the beam, in either case cutting off the laser output.

8 Claims, 6 Drawing Figures

FIG. 1

ARC OPERATED Q SWITCH FOR LASER

In the operation of a laser, it is often desirable to provide a control signal to the laser beam to modulate or switch the beam on and off at a rapid rate. This has generally been accomplished in the prior art by means of a "Q" switch which develops a plasma in the path of the beam and absorbs the light energy. This type of switching has several shortcomings. First, it has been found that plasma absorption is wavelength dependent, i.e., energy at certain wavelengths is absorbed more readily than at others. This means a relatively high density plasma is required to effectively block the light beam, which requires high power for its generation. Further, such devices of the prior art are limited as to the repetition rate at which they can be operated, due to their inherent slow recovery. The present invention provides a distinct advantage over the prior art in that it is not wavelength dependent, and requires substantially less power for its operation (particularly significant when used with high power lasers of large output aperture). Further, the device of the present invention has a relatively rapid recovery and can be operated at high repetition rates.

Briefly described, the invention is as follows: The laser beam is passed between a pair of metal electrodes which are mounted in a chamber which may have air therein at or below atmosphere pressure or may be filled with nitrogen. An arc is generated between the electrodes in response to a triggering signal, this arc causing ablation of the electrodes and the formation of a vapor spot therebetween. In one embodiment, this spot is substantially smaller than the laser beam spot and is located at one side thereof so that it effectively refracts or steers the beam away from its original path, thereby cutting off the laser output. In a second embodiment, the vapor spot is made large enough to effectively block the entire laser beam, to effect cutoff thereof.

Referring now to the drawings.

Figure 1:
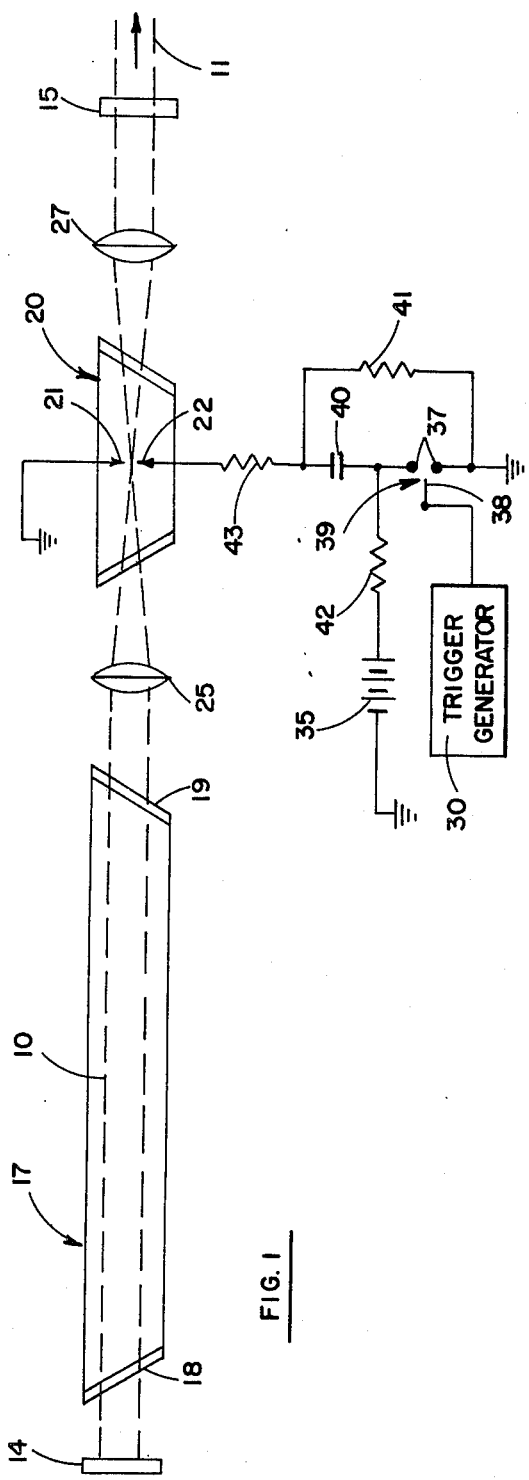
FIG. 1 is a schematic drawing of a preferred embodiment of the invention.

Referring now to FIG. 1, a preferred embodiment of the invention is schematically illustrated. Laser output beam 11 is generated by means of the oscillatory reflections of beam 10 between totally reflective mirror 14 and partially reflective mirror 15, the beam being passed through laser tube 17. Tube 17 may be filled with a gas mixture such as carbon monoxide and helium, which is stimulated in conventional fashion by means of an appropriate power source (not shown) to effect the lasing action. Tube 17 has a pair of highly transparent windows 18 and 19 on the opposite ends thereof to permit the efficient passage of the light beam therethrough. Interposed in the path of the beam is chamber or cell 20 which has highly transparent windows at the opposite ends thereof to permit the efficient passage of the light beam therethrough. Cell 20 may have air therein or may be filled with another gas such as nitrogen. Optimum operation of the preferred embodiment has been obtained with cell 20 having air or nitrogen therein at pressures from 500 torr to 1 atmosphere.

Cell 20 has a pair of metal electrodes 21 and 22 mounted therein, these electrodes being positioned opposite each other. Light beam 10 is focused between electrodes 21 and 22 by means of lens 25 so that the beam has a predetermined spot size as it passes between the electrodes. The beam is restored to its original width by means of lens 27 from where is passes to partially reflective mirror 15 from where part of the light is reflected back towards mirror 14 and part of the light is passed through the mirror to provide output beam 11.

Light beam 10 is interrupted in response to trigger signals from trigger generator 30 in the following manner: Trigger generator 30 provides a predetermined trigger signal which is fed to trigger electrode 38 of triggered spark gap 39 thereby generating an arc between electrodes 37. Capacitor 40 had previously been charged through resistor 41 (typically of the order of 150 K ohm) to the voltage of power source 35, which may be of the order of 20 Kilovolts and which is connected to the capacitor through resistor 42 (of the order of 5 megohms). With the generation of an arc between electrodes 37, the terminal of the capacitor connected to one of the electrodes is effectively grounded, placing the charge on the capacitor between electrodes 21 and 22. This generates an arc between electrodes 21 and 22, the capacitor discharging through the discharge path formed by resistor 43 (of the order of 100 ohms) and the arc formed between electrodes 21 and 22. It has been found that optimum operation can be obtained with an RC time constant of 10 microseconds for the discharge circuit formed by capacitor 40 and resistor 43. Spark gap 37 may be a commercially available triggered spark gap, such as fabricated by Maxwell Laboratories, San Diego, Ca.

Figure 2:
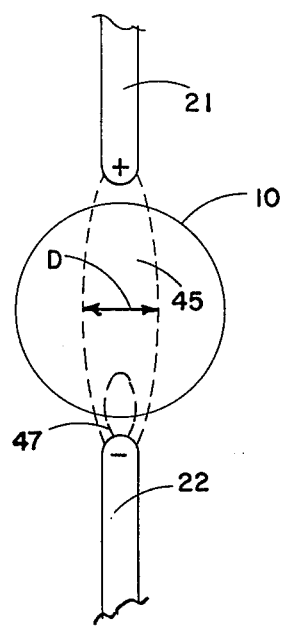
FIG. 2 is a schematic drawing illustrating the operation of the preferred embodiment.
Figure 4:
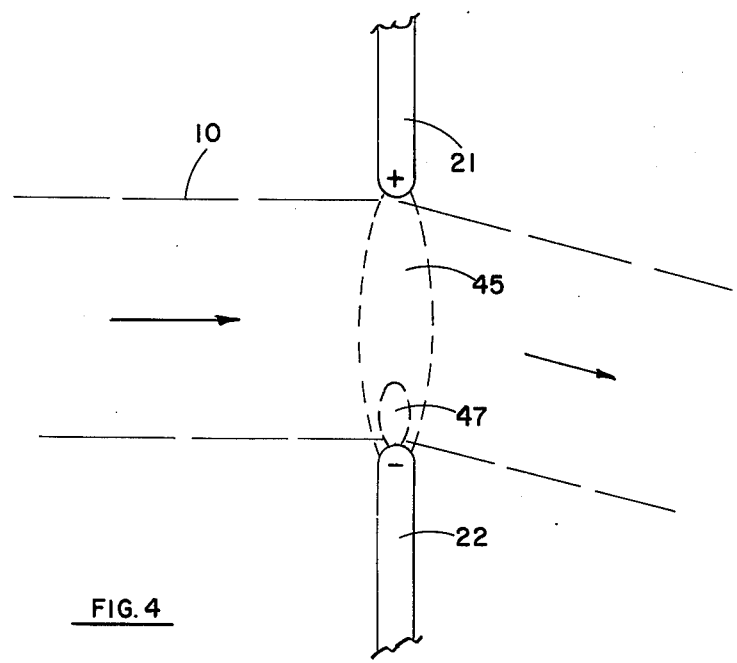
FIG. 4 is a schematic drawing illustrating the refraction of the laser beam in the preferred embodiment.

Referring now to FIGS. 2 and 4, the operation of the preferred embodiment is schematically illustrated, FIG. 2 being a front elevation view and FIG. 4 being a side elevation view showing the beam passing between electrodes 21 and 22. With the triggering action, an arc 45 is developed between the electrodes. This arc causes the ablation of material from electrode 22 to form a vapor spot 47. Electrodes 21 and 22 may be formed of a metal such as steel or copper, etc., type 304 stainless steel having been found to produce satisfactory results. The metal vapor 47 causes refraction of the beam as shown in FIG. 4, steering such beam away sufficiently so that the light energy is no longer aligned with mirror 15, thereby cutting off the laser output through spoiling the Q of the optical resonator. It has been found that highly effective switching action can be obtained with a diameter for beam 10 which is about four times the diameter D of the channel of arc 45 (see FIG. 2). The focused beam size can be controlled by means of the lens system comprising lenses 25 and 27, while the diameter of the arc can be controlled by the choice and spacing of the electrodes as well as the design of the arc actuating circuit. In an operative embodiment of the invention, satisfactory results were obtained with the following parameters:

Diameter of cylindrical electrodes 21 and 22 — 0.020 inches
Diameter of laser spot 10 — 0.4 inches
Diameter of arc 45 (as indicated by D in FIG. 2) — 0.1 inches
Voltage output of power source 35 — 20 kv
Resistor 41 — 150 K Ohms
Capacitor 40 — 0.1 microfarads
Resistor 42 — 5 megohms
Resistor 43 — 100 ohms
Electrodes 21 and 22 fabricated of 304 Stainless Steel.

Figure 3:
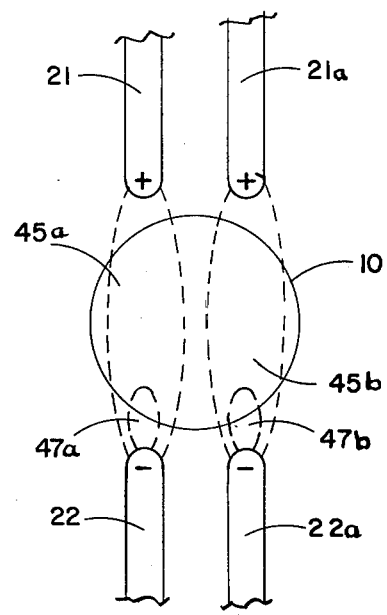
FIG. 3 is a schematic drawing illustrating the operation of an embodiment utilizing two pairs of electrodes.

Referring now to FIG. 3, an alternative embodiment of the invention is schematically illustrated, this embodiment utilizing two pairs of electrodes 21, 22 and 21a, 22a. With this embodiment a pair of arcs 45a and 45b are formed along with a pair of vapor spots 47a and 47b. While it appears from experiments conducted thus far that a single pair of electrodes can be utilized to steer the laser beam, it is possible that in certain instances, for example where dealing with wider diameter beams, a plurality of electrodes might be needed to achieve the steering action necessary to effect switching of the laser beam.

Figure 5:
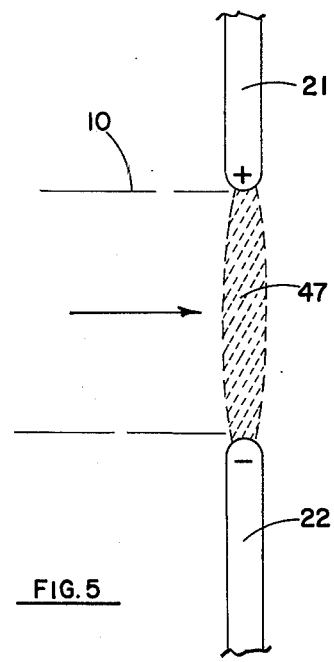
FIG. 5 is a schematic drawing illustrating the operation of an embodiment wherein the laser beam is fully blocked.

Referring now to FIG. 5, the operation of a second embodiment of the invention is illustrated. In this second embodiment, the arc is made intense enough to cause the ablated material to have a great enough volume so as to form a spot 47 of great enough size to cover the entire space between the electrodes 21 and 22 and over a sufficient area to fully block the passage of beam 10 or to attenuate the beam sufficiently to effect the switching action. This second embodiment of course requires much greater power than the first, but might have its application in instances where the steering action may not be adequate to effectively cut off the beam.

Figure 6:
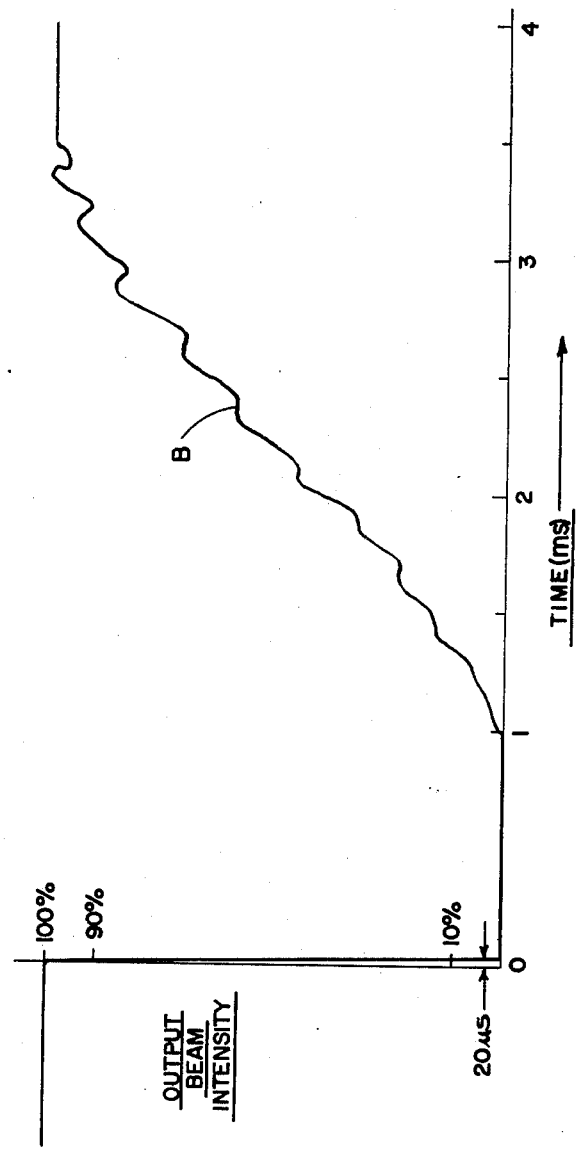
FIG. 6 is a graphical representation of the switching action in a typical implementation of the preferred embodiment.

Referring now to FIG. 6, a graph indicating the laser output beam intensity for typical operation of the preferred embodiment is shown. As can be seen, in this exemplary situation the output beam intensity goes from full output down to zero in 20 microseconds with the output remaining at zero for a full millisecond. As indicated by graph line B, the output returns to maximum in about 2.5 milliseconds thereafter.

This invention thus provides a simple yet highly effective means for switching a laser which is not subject to the wavelength dependency and high power requirements of the prior art. Further, the device of the present invention is capable of operating at a relatively high repetition rate, as compared with prior art devices.

While the invention has been described and illustrated in detail, it is to be clearly understood that this is intended by way of illustration and example only and is not to be taken by way of limitation, the spirit and scope of this invention being limited only by the terms of the following claims.

We claim:

1. In a laser having a lasing medium, a pair of mirrors positioned on opposite sides of said lasing medium for effecting the oscillation of a light beam through said medium, means for switching the laser beam in response to a trigger signal comprising:
   a pair of electrodes positioned opposite each other between said mirrors;
   means for focusing said beam so as to pass between said electrodes; and
   means for generating an arc between said electrodes in response to said trigger signal whereby material from at least one of said electrodes is ablated to form a metallic vapor spot, said vapor spot interrupting the path of at least a portion of said beam, said beam output being switched off while said metal vapor spot is present.

2. The device of claim 1 wherein said arc generating means comprises means for generating an arc forming a vapor spot which intercepts a side portion of the laser beam thereby steering said beam away from one of said mirrors so as to interrupt the oscillation of said beam.

3. The device of claim 2 wherein said arc generating means comprises means for generating an arc which has a diameter which is approximately ¼ the diameter of the laser beam.

4. The device of claim 1 wherein said arc generating means comprises means for generating an arc having sufficient intensity to form a vapor spot which substantially blocks the entire laser beam.

5. The device of claim 1 wherein said means for generating said arc comprises a resistive-capacitive charge-discharge circuit connected to one of said electrodes and a triggered spark gap, means for charging said capacitor, said spark gap being connected between said charge-discharge circuit and the other of said electrodes and trigger generator means for firing said triggered spark gap thereby placing the charge on said capacitor between said electrodes to generate said arc therebetween.

6. A method for switching a laser comprising:
   placing a pair of electrodes opposite each other in the path of the laser beam,
   focusing the laser beam so it passes between said electrodes, and
   generating an arc between the electrodes so as to ablate material from at least one of the electrodes, the ablated material forming a vapor spot which at least partially interrupts said beam so as to switch off the output of said laser.

7. The method of claim 6 wherein the arc is generated to have a diameter to form a metal vapor spot near one edge of the beam so as to effect the steering thereof away from its oscillatory reflection path.

8. The method of claim 6 wherein the arc is generated in sufficient intensity to form a metal vapor spot large enough to effectively block the entire laser beam.

* * * * *